United States Patent [19]

Collette et al.

[11] Patent Number: 4,863,046

[45] Date of Patent: Sep. 5, 1989

[54] HOT FILL CONTAINER

[75] Inventors: Wayne N. Collette, Merrimack; Suppayan M. Krishnakumar, Nashua; David P. Piccioli, Auburn, all of N.H.

[73] Assignee: Continental PET Technologies, Inc., Norwalk, Conn.

[21] Appl. No.: 137,565

[22] Filed: Dec. 24, 1987

[51] Int. Cl.⁴ ................ B65D 1/02; B65D 23/00
[52] U.S. Cl. ..................... 215/1 C; 220/72
[58] Field of Search ........... 215/1 C; 220/70, 72; D9/370, 396, 434

[56] References Cited

U.S. PATENT DOCUMENTS

| | | |
|---|---|---|
| D. 295,381 | 4/1988 | Papa .................. D9/396 X |
| D. 295,382 | 4/1988 | Rogler ............... D9/396 X |
| 4,233,022 | 11/1980 | Brady et al. ....... 215/1 C X |
| 4,385,089 | 5/1983 | Bonnebat et al. ... 215/1 C X |
| 4,406,854 | 9/1983 | Yoshino ............ 215/1 C X |
| 4,467,929 | 8/1984 | Jakobsen et al. ... 215/1 C |
| 4,496,064 | 1/1985 | Beck et al. ......... 215/1 C |
| 4,497,855 | 8/1985 | Agrawal et al. ... 215/1 C X |
| 4,610,366 | 9/1986 | Estes et al. ........ 215/1 C |
| 4,618,515 | 10/1986 | Collette et al. ... 219/1 C X |
| 4,755,404 | 7/1988 | Collette ............ 215/1 C X |

FOREIGN PATENT DOCUMENTS 198587 10/1986 European Pat. Off. ............ 215/1 R

OTHER PUBLICATIONS

"Gatorade Tests Bottle" by Mark Spaulding from Packaging, Oct. 1987, vol. 32, No. 12, pp. 10-12.

Primary Examiner—Sue A. Weaver
Attorney, Agent, or Firm—Charles E. Brown; Paul Shapiro; Charles A. Brown

[57] ABSTRACT

A blow molded container which is formed of a polyester resin which has formation and shape characteristics wherein it may be hot filled with a liquid at a temperature on the order of 180°–185° F. with a maximum volumetric shrinkage of no greater than 1 percent. The container is formed from a specially configured injection molded preform which is initially stretched axially only on the order of 25 percent, after which the preform is inflated and blow molded within a blow mold to a configuration which resists vacuum collapse or paneling of the body.

5 Claims, 2 Drawing Sheets

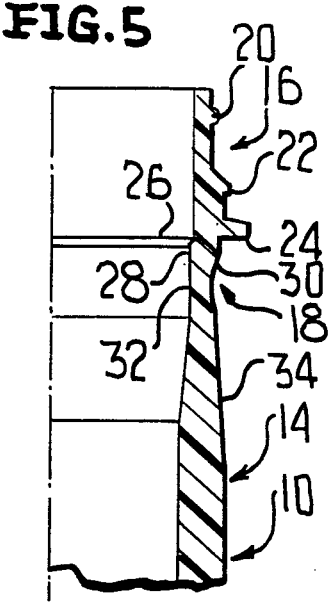
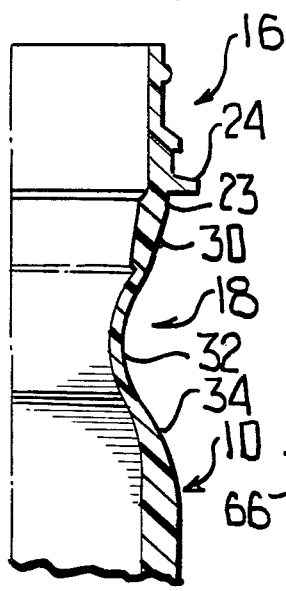
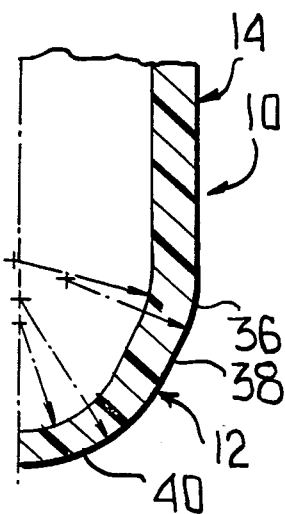
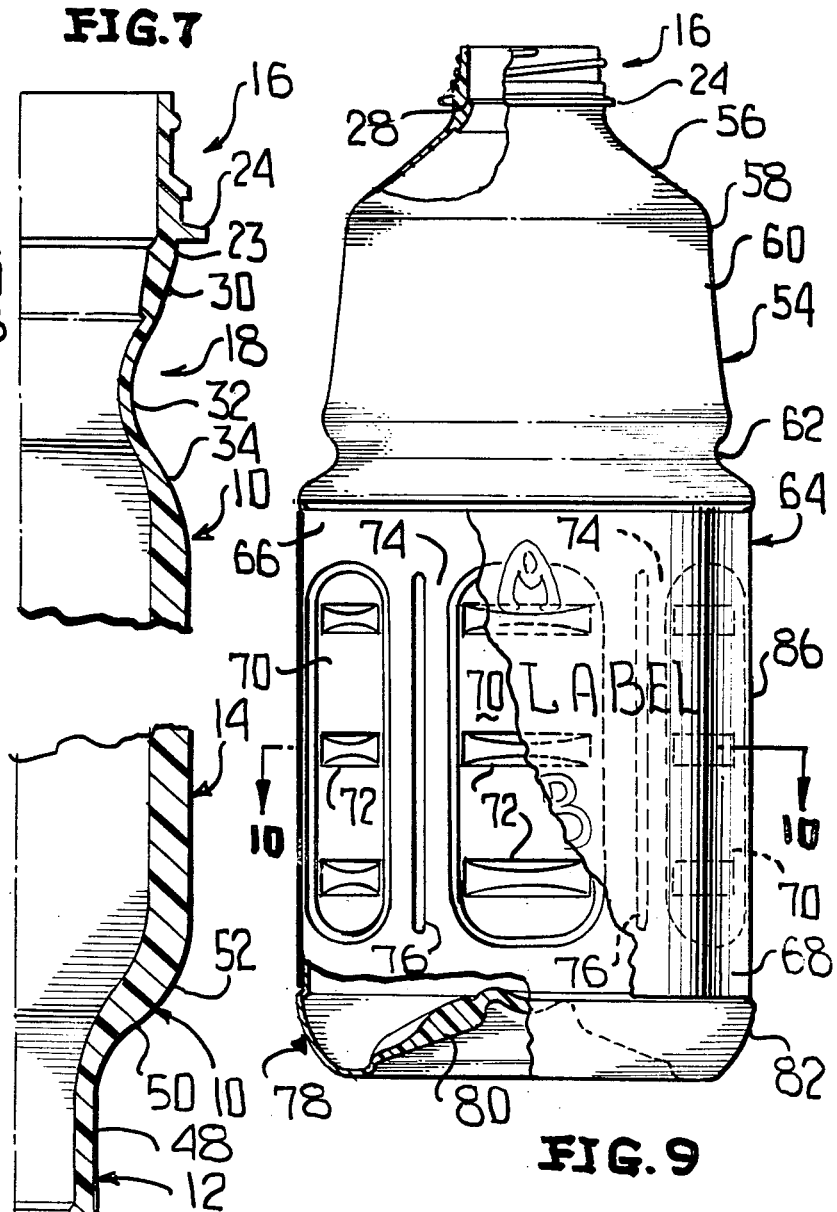
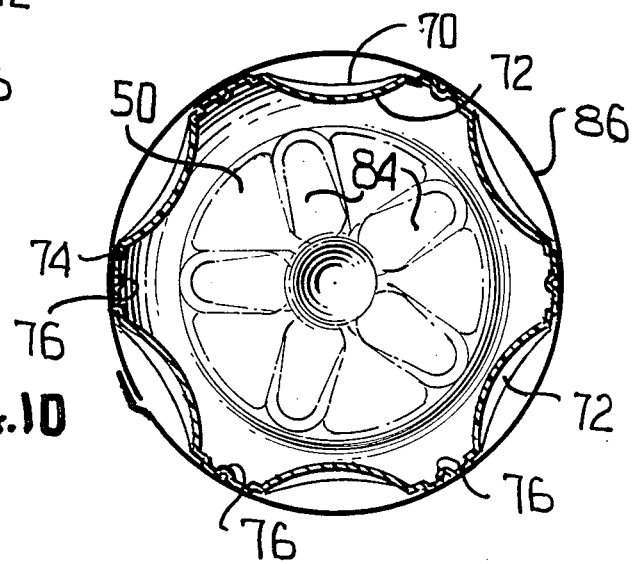

HOT FILL CONTAINER

This invention relates in general to new and useful improvements in plastic containers, and more particularly to a container which is blow molded of a polyester resin and for the most part is highly biaxially oriented, but has a non-oriented neck finish for receiving a closure. Such a container must receive a hot fill product with a minimum of shrinkage and distortion.

In the past there have been developed wide mouth containers wherein the closure receiving portion or neck finish is highly biaxially oriented, Further, the neck finish may be subjected to thermal crystallization. Such a container and the method of forming the same is disclosed in U.S. Pat. No. 4,618,515.

This patent, in turn, is an improvement on an earlier granted U.S. Pat. No. 4,496,064.

It is now desired to form containers having a non-oriented injection molded neck finish which is relatively small in diameter and which container is particularly adapted for the packaging of liquids, which liquids must be placed into the container while hot to provide for adequate sterilization.

One of the problems of forming a container with an injection molded neck finish is that immediately adjacent to the neck finish is a neck to body transition which normally has low biaxial orientation. This region tends to distort to a high degree when exposed to temperatures above 160° F. In the past this distortion problem has been solved by increasing the temperature resistance of PET through thermal crystallization since the degree of orientation is not adequate to yield sufficient strain crystallization to increase the temperature resistance of PET in this region. One of the features of this invention is to solve that problem.

Another problem in the art is the tendency of the body of the container to shrink such that the overall shrinkage of the container is in excess of 1 percent which is the present desired maximum permissible shrinkage. In accordance with this invention, it has been found that through the application of specific process techniques, the shrinkage of the container, when hot filled with a liquid, will be no greater than 1 percent. Further, the paneled body is so configurated wherein a conventional label may be wrapped around the body and be sufficiently supported by the body notwithstanding the provision of the vacuum panels.

With the above and other objects in view that will hereinafter appear, the nature of the invention will be more clearly understood by reference to the following detailed description, the appended claims, and the several views illustrated in the accompanying drawings.

FIG. 5 is an enlarged fragmentary sectional view of that portion of the preform identified in FIG. 1.

FIG. 6 is an enlarged fragmentary vertical sectional view of that form of the preform identified in FIG. 1.

FIG. 7 is an enlarged fragmentary sectional view of the upper portion of the preform as shown in FIG. 5 after the preform has been stretched in the manner shown in FIG. 3.

FIG. 8 is an enlarged fragmentary sectional view of the lower part of the preform shown in FIG. 6 after the axial elongation of the preform as shown in FIG. 3.

FIG. 9 is an elevational view with parts broken away and shown in section of a container formed in accordance with this invention in the blow mold as shown in FIG. 4 and having a label applied to the body thereof.

FIG. 10 is a horizontal sectional view taken generally along the line 10—10 of FIG. 9 and shows further the details of the container and the associated label.

Figure 1:
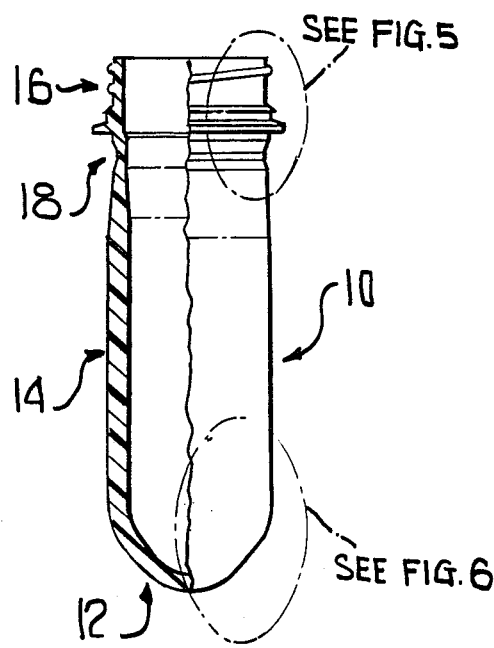
FIG. 1 is an elevational view with parts broken away of a preform formed in accordance with this invention.
Figure 4:
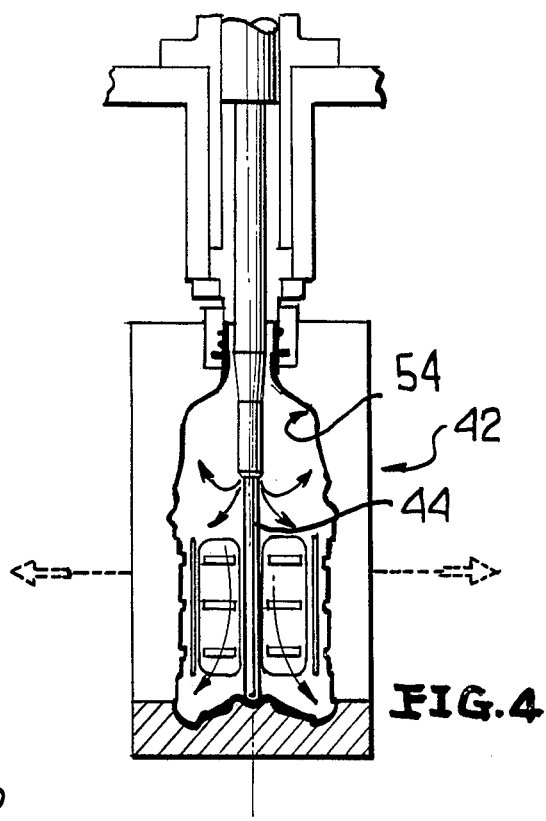
FIG. 4 is yet another schematic vertical sectional view showing the previously axially elongated preform being blow molded to match the configuration of the blow mold.

This invention starts with a special preform 10 which is best illustrated in FIGS. 1 and 5-8. The preform 10 is injection molded of a polyester resin with particular reference being made to PET (polyethylene terephthalate). Basically speaking, the various portions of the preform 10 may be identified as including a base portion 12, a body portion 14, a neck finish portion 16 and a neck to body transition 18.

Referring now to FIG. 5, it will be seen that the upper part of the preform 10 is illustrated in detail. First of all, the illustrated neck finish portion 16 is in the form of a conventional neck finish which may include external threads 20 for receiving a closure, a locking bead 22 for engagement by a closure tamper indicating ring or band, and a lower flange 24.

Immediately below the flange 24 is the neck to body transition 18. It starts with an internal thickening to define a seat 26 for receiving, for example, a blow nozzle in seated engagement. Immediately below the seat, the transition may include a cylindrical part 28. Below the cylindrical part 28, the transition 18 downwardly tapers in thickness externally as at 30 terminating in a further cylindrical part 32 of minimal cross section. Below the cylindrical part 32, the transition 18 flares both internally and externally as at 34 to join the greater thickness body portion 14.

Referring now to FIG. 6, it will be seen that the base portion begins at the lower end of the body 14 with a radius part 36 which joins a frustoconical part 38 to the body portion 14. The frustoconical part, in turn, carries a part spherical bottom 40 which tapers in thickness from the frustoconical part 38.

It is to be understood that the preform 10 is formed by injection molding and when presented to the blow molding apparatus (not shown) is at room temperature. A preform, in a normal blow molding operation, is heated by a series of quartz heaters which results in the heating of the outer surface of the preform to a higher temperature than the inner surface. On the other hand, radio frequency heating has been utilized with the result that the inner surface of the preform is heated to a higher temperature. Hybrid heating utilizing a combination of quartz heaters and radio frequency heaters has been utilized in the past to obtain a uniform temperature throughout the wall of the preform. Such a heating process is disclosed in U.S. Pat. No. 4,407,651.

More recently it has been found that if the average preform temperature is increased to 225° F. as compared to the permissible average temperature in the 200°-210° F. range permissible with quartz heating and the 210°-220° F. range permissible with radio frequency heating, shrinkage of a biaxially oriented PET container is reduced to 2 percent or less and by increasing the average temperature of the reheated preform at the time of stretch blowing to as high as 260° F., the container shrinkage is reduced to on the order of less than 1 percent.

In accordance with this recent development in reheating of preforms, which is the subject of a pending U.S. application, the preform 10 will be reheated first utilizing a quartz oven or like quartz heater with this first reheating treatment resulting in the outside surface temperature of the preform rising to on the order of 240° F. while the inside surface of the preform is only slightly heated to a temperature on the order of 120° F. The temperature of the center of the body wall of the preform is only slightly greater than the inside surface temperature and is on the order of 140° F. The initial reheating time is on the order of 14.5 seconds.

After the first quartz reheating, the reheating is discontinued and the preform is permitted to equilibrate for a period of time on the order of 5 seconds. The temperature of the outside surface of the preform body continues to increase to a temperature on the order of 250° F. and then begins to cool down to a temperature on the order of 230° F. At the same time, the temperature of the center of the preform body remains generally constant while the temperature of the inside surface of the preform body increases gradually to a temperature on the order of 135° F., the temperature of the inside surface of the preform body approaching that of the center of the preform body.

Thereafter, it is preferred that further reheating of the preform be also by way of a quartz heater for a reheating period. The time of this further quartz reheating is on the order of 12.5 seconds and during this second period of quartz reheating, the temperature of the exterior surface of the preform body continues to rise above the temperature of the center of the preform body and the inside surface of the preform body. The exterior surface temperature rises to on the order of 350° F. while the inside surface temperature slowly gradually rises to a temperature on the order of 180° F. and the temperature at the center of the preform wall slowly rises at a slightly greater rate to a temperature on the order of 220° F.

After the second quartz reheating, once again the temperature of the exterior surface of the preform body is much greater than that of the interior surface and the temperature at the center of the preform body has also gradually increased above that of the interior surface of the preform body.

The preform body is immediately thereafter further reheated by way of radio frequency heating. While the temperature of the outside surface of the preform body rises only slightly during the radio frequency heating, the heating of the inside surface of the preform body very rapidly increases from the temperature generally on the order of 160° F. to a temperature slightly greater than 300° F. The time of radio frequency heating is on the order of 2 seconds. During this time there is only a minor increase in the temperature of the preform body at the center of the cross section thereof to a temperature on the order of 240° F. Thus the temperature of the center of the preform body cross section is the lowest and the temperatures of the inside surface and outside surface are greater.

At this point, the application of external heat to the preform is stopped and the preform is directed into a blow mold, as will be discussed hereinafter, and blow molding steps are initiated with there being a total lapse of time on the order of 6 seconds. During these 6 seconds, there is a second equilibration of the preform.

During the second temperature equilibration, the temperature of the outside surfaces of the preform body will rapidly decrease to a temperature on the order of, but below 280° F. At the same time, the temperature on the inside surface of the preform body will continue to increase and then taper off to a temperature on the order of 350° F. In a like manner, the temperature of the preform at the center of the body cross section will rise and then taper off at a temperature on the order of 260° F. It will thus be seen that the temperature at the center of the cross section of the preform body is still the lowest, but the temperature of the outside surface is only slightly greater.

Inasmuch as crystallization is a factor of temperature and time and since the time during which surface crystallization may occur after reheating of the preform to its maximum temperature is reduced, the desired high reheat temperature may be obtained in accordance with this reheating method without the undesired surface crystallization.

Figure 2:
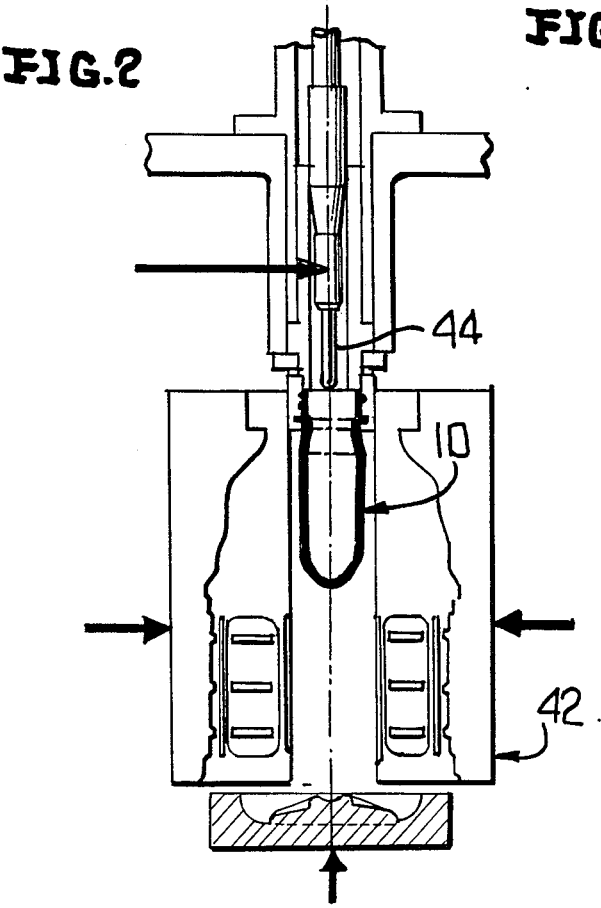
FIG. 2 is a schematic sectional view showing the preform of FIG. 1 initially being placed in a blow mold.
Figure 3:
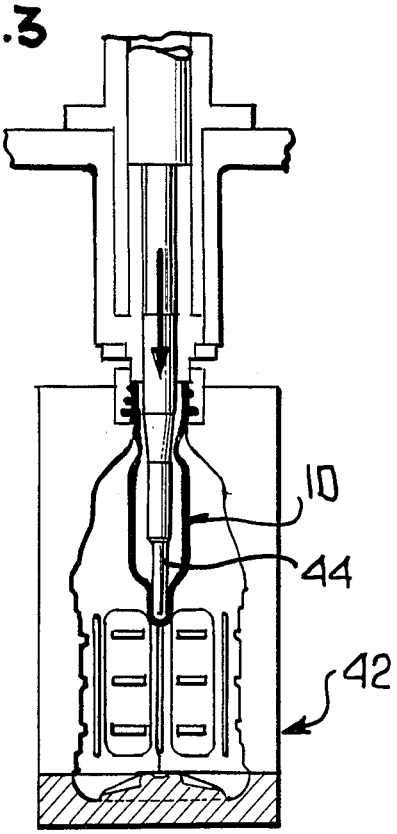
FIG. 3 is another schematic vertical sectional view similar to FIG. 2 and shows a mechanical axial elongation of the preform.

It is known to utilize a stretch rod to axially elongate a preform within a blow mold to assure the complete axial elongation of the preform. However, normally a similar rod is utilized solely for the purpose of maintaining the preform in a centered relationship with respect to the blow mold as the preform is inflated. However, in accordance with this invention, it is proposed to utilize the normal centering rod initially as a stretch rod, but prior to the introduction of a blowing gas into the preform. Thus, as is schematically shown in FIG. 2, the preform 10, duly heated in the manner described above, is placed within an open split blow mold, generally identified by the numeral 42 in a conventional manner. After the blow mold 42 has been closed, as shown in FIG. 3, instead of immediately beginning the inflation of the preform, the customary centering rod 44 is directed down into the preform 10 and engages the bottom part 40. The rod 44 is utilized to elongate the preform on the order of 25 percent, as is shown in FIG. 3. The results of this elongation of the preform 10 are best shown in FIGS. 7 and 8. Since the reheating of the preform 10 stops on the order of 2 mm below the flange 24, and since the preform is supported against axial movement within the blow mold by the flange 24, there is no deformation or elongation of the neck finish portion 16. On the other hand, since the central part of the neck to body transition 18 is of minimum cross section, it will be seen that there will be considerable elongation of the neck to body transition 18. This will occur primarily in the cylindrical part 32 but will also occur partially within the downwardly tapering portion 30 and the downwardly flaring portion 34. Further, and most particularly, it will be seen that when the transition 18 is axially elongated, it will also neck down so as to assume a radially inwardly directed bowed configuration thus in effect reducing the diameter of the central part of the transition 18. Because of the radially inwardly directed bowing of the transition 18, it will be seen that in the blow molding of the preform 10 within the blow mold 42 there will be a greater stretching of this portion of the preform in the hoop direction.

With reference to FIG. 8, it will be seen that since the base portion 12 of the preform 10 is also heated to a high temperature, when it is engaged by the stretch rod 44, its resistance to thinning will not be as great as that of the body 14 so that there will be an elongation of the base portion 12 as is best shown in FIG. 8. This elongation will be primarily in the radially outer portion of the body part 40 and in the frustoconical part 38 with the result that there will be a newly formed body part 46 which is generally hemispherical together with a cylindrical part 48 in accordance with the diameter of the stretch rod 44. Finally there will be an upwardly flaring generally frustoconical part 50 which joins the cylindrical part 48 to the body 14 by way of a curved part 52.

The preform 10, having been elongated on the order of 25 percent, is now ready for the introduction of a blow gas so that the preform 10 may be inflated in the customary manner to match the configuration of the blow mold 42. If desired, during the inflation of the stretched preform 10, the stretch rod 44 may be permitted to follow the axial elongation of the preform during inflation so as to make certain that the base portion 12 of the preform remains centered relative to the blow mold. The inflation of the preform 10 within the blow mold 42 results in the formation of a container in the form of a bottle generally identified by the numeral 54.

It is to be understood that the shape of the container or bottle 54 is also critical in the hot fill shrinkage thereof. As will be apparent, the bottle 54 will have a neck finish which is identical with the original neck finish 16 of the preform 10 including the flange 24 and a portion of the preform immediately below the flange which was not heated, as previously described. This portion is generally in accordance with the previously described part 28 of the preform.

The bottle 54 also includes a downwardly and outwardly sloping shoulder portion 56 which is formed from the previously stretched neck to body transition portion 18. The shoulder portion 56 in conventional container constructions is generally of a low orientation and is gradually formed during the inflation of the preform. However, inasmuch as the shoulder portion 56 is defined by that part of the preform which was very rapidly mechanically stretched followed by the inflation of the preform, the shoulder portion 56 has a high strain crystallization.

In accordance with the design configuration of the illustrated bottle 54, the shoulder portion 56 is connected by a radius 58 to an upper body portion 60 which flares slightly outwardly and downwardly. The upper body portion 60 terminates in a radially inwardly directed rib 62 which, in turn, is connected to a generally cylindrical main body portion 64. The main body portion 64 includes upper and lower cylindrical bands 66, 68 with the body portion 64 between the bands 66, 68 including a plurality of radially inwardly recessed vacuum pressure panels 70. Each pressure panel 70, as is best shown in FIG. 9, is of a vertically elongated rectangular configuration with rounded corners and is generally chordal in configuration. Each pressure panel 70 is reinforced against deformation by a plurality of transverse horizontally extending radially recessed ribs 72 which are also of an elongated rectangular outline, but the elongation being in the horizontal or circumferential direction.

Adjacent pressure deformable vacuum panels 70 are separated by a vertically elongated land area 74. Each land area 74 extends between the bands 66, 68 and is reinforced by a vertically extending, radially inwardly directed rib 76.

The bottle 54 also includes a base 78 which includes a ribbed recessed bottom 80 which is joined to the body 64 by a rounded base portion 82. The ribbed bottom, which is best shown in FIG. 10, may include five circumferentially spaced, radiating downwardly directed ribs 84 which are defined by the base configuration of the blow mold 42.

As is best shown in FIG. 9, the bands 66, 68 are recessed radially inwardly a slight distance with respect to the lower part of the rib 62 and the rounded portion 82 of the base portion 78. This permits a conventional, low cost, full wrap label 86 to be applied to the body portion 64 in a protected position. As is clearly shown in FIG. 10, the label 86 bridges the recessed pressure deformable vacuum panel 70 so as to give the bottle 54 the appearance of one wherein the body portion 64 is cylindrical.

It is to be understood that due to the specific high temperature of the preform 10 which is possible in accordance with the heating procedure outlined above, and because of the specific stretch ratio of the blow bottle 54 with respect to the preform 10 in both the axial and hoop directions, the resultant bottle 54 has in the body portions thereof a 28–30 percent sidewall crystallization which is a stress induced crystallization as opposed to being a temperature induced crystallization. Further, because of the specific cross sectional configuration of the body portion 64 as well as the specific stress induced crystallization of the shoulder portion 56, when the bottle 54 is hot filled with a liquid at a temperature on the order of 180°–185° F., the shrinkage of the bottle 54 by volume will be no greater than 1 percent, i.e. the volumetric shrinkage should be between 0 and 1 percent. Thus the bottle 54, when hot filled with a heated liquid, will maintain this configuration. Further, because the neck finish 16 is non-oriented, it will be subjected to heat deformation. However, because the neck finish 16 is injection molded and relatively thick, it will be able to withstand the momentary heating thereof to a relatively high temperature without deformation which will prevent the closing and sealing of the bottle 54 utilizing conventional closures, particularly screw threaded closures.

It will also be noted that the recessed bottom or base portion 80 is of a relatively thick wall configuration and will resist deformation when the bottle 54 is filled with a heated liquid.

Although only a preferred embodiment of the container and the method of forming the same, including a preferred embodiment of preform, has been specifically described and illustrated, it is to be understood that minor variations may be made in the invention without departing from the spirit and scope of the invention as defined by the appended claims.

We claim:

1. A hot fill polyester resin blow molded container comprising a base, a cylindrical body, a shoulder portion, and a neck finish, said body having a plurality of circumferentially spaced and axially elongated recessed pressure deformable vacuum panels separated by vertical land areas, and circumferential land areas above and below said vacuum panels joined to said vertical land areas, said vertical land areas being reinforced by vertical ribs.

2. A hot fill container according to claim 1 together with a label extending around said body over said vacuum panels and supported by said circumferential land areas.

3. A hot fill polyester resin blow molded container comprising a base, a cylindrical body, a shoulder portion, and a neck finish, said body having a plurality of circumferentially spaced and axially elongated recessed pressure deformable vacuum panels separated by vertical land areas, and circumferential land areas above and below said vacuum panels joined to said vertical land areas, said body having a crystallization on the order of 28 to 30 percent and a shrinkage no greater than 1 percent when filled at 180°–185° F.

4. A hot fill polyester resin blow molded container comprising a base, a cylindrical body, a shoulder portion, and a neck finish, said body having a plurality of circumferentially spaced and axially elongated recessed pressure deformable vacuum panels separated by vertical land areas, and circumferential land areas above and below said vacuum panels joined to said vertical land areas, said shoulder portion includes a neck to body transition, said neck to body transition having a low biaxial orientation and is free of heat crystallization, said neck to body transition having a shrinkage no greater than 1 percent when filled at 180°–185° F. due to a rapid initial axial elongation of said neck to body transition followed by inflation.

5. A hot fill container according to claim 4 wherein said vacuum panels are reinforced against deformation by horizontal ribs.

* * * * *